M. O. SMITH.
STORAGE BATTERY.
APPLICATION FILED JUNE 9, 1919.
1,376,171.
Patented Apr. 26, 1921.
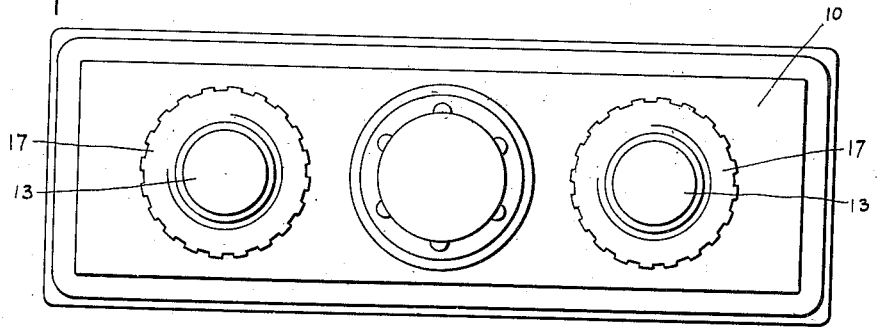
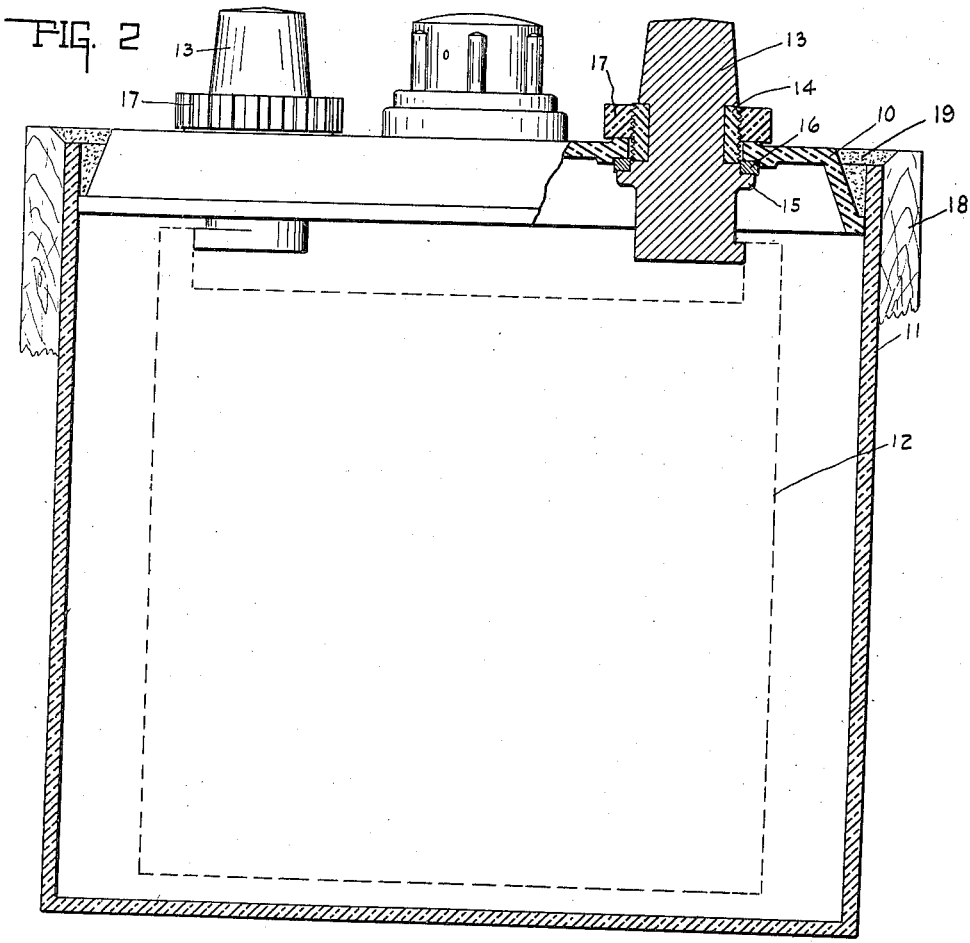
INVENTOR
MALCOM O. SMITH
BY
Lockwood & Lockwood
ATTORNEYS.

UNITED STATES PATENT OFFICE.

MALCOM O. SMITH, OF INDIANAPOLIS, INDIANA, ASSIGNOR TO PERMALIFE STORAGE BATTERY CO., OF POUGHKEEPSIE, NEW YORK, A CORPORATION OF NEW YORK.

STORAGE BATTERY.

1,376,171.      Specification of Letters Patent.      Patented Apr. 26, 1921.

Application filed June 9, 1919. Serial No. 302,866.

*To all whom it may concern:*

Be it known that I, MALCOM O. SMITH, a citizen of the United States, and a resident of Indianapolis, county of Marion, and State of Indiana, have invented a certain new and useful Storage Battery; and I do hereby declare that the following is a full, clear, and exact description thereof, reference being had to the accompanying drawings, in which like numerals refer to like parts.

This invention relates to a storage battery, and more particularly to the construction of the terminal posts therefor, which may be readily removed without their destruction and will prevent sulfate from collecting around them, the construction of said post being such that the cap or top of the battery may be removed. Heretofore the cap of the storage battery has been made of a combination of wax formed in the top of the battery, and not removable therefrom excepting by destroying the cap, and the terminals have been mounted in the cap in such a way that they are not removable, which necessitates their destruction when it is desired to remove them from the battery.

This is accomplished by means of providing the terminal posts with a threaded hard rubber sleeve cast thereon so that they may be inserted in the cap and locked thereon by means of a threaded hard rubber nut; whereby said cap may be removed without destroying the posts, said nut making a seal to prevent sulfate from collecting about the posts.

Referring to the drawings, which are made a part of this application, Figure 1 is a plan view of the cap showing the terminals in position. Fig. 2 is a central vertical cross section through the battery with a portion of the cap and one post in elevation.

In the drawings there is shown a non-corrosive cap 10 made of hard rubber, which fits snugly in the top of the hard rubber jar 11 containing the plates 12. The cap 10 is provided with holes in the top thereof through which the metal terminal posts 13 extend, sasid posts being formed of lead and molded with a non-corrosive threaded hard rubber sleeve 14 therein, and provided with a flange 15 adapted to engage the under side of the cap 10. A rubber gasket 16 is provided to be engaged between the flange 15 and the cap so as to seal the joint, and a non-corrosive hard rubber thumb nut 17 is adapted to screw on to the sleeve 14 over the top of the cap so as to draw the terminals up and clamp the flange 15 and gasket 16 tightly against the cap so as to hold it securely in place and prevent any leakage therethrough, whereby sulfate will be prevented from forming on said posts.

The lower ends of the terminals are adapted to engage the plates 13 and be secured thereon so as to make contact therewith. The cap 10 is then sealed in the battery box 18 by means of a sealing compound 19. In removing the cap and plates from the jar, the sealing compound is broken, the nuts 17 are removed and the cap lifted off, while the terminal posts remain fixed to the plates. The terminal posts and plates may then be drawn out of the jar.

The invention claimed is:

1. A storage battery having a non-corrosive jar with a plurality of plates therein, a non-corrosive cap mounted on said jar for inclosing said plates, a plurality of terminals adapted to engage said plates, a non-corrosive screw threaded sleeve formed upon and secured in each of said terminals and a non-corrosive thumb nut adapted to screw on said sleeve for removably securing said cap on said terminals.

2. A storage battery having a non-corrosive jar with a plate therein, a non-corrosive cap removably mounted on said jar for inclosing said plate, a terminal adapted to engage said plate and having a flange adapted to engage the under side of said cap, a non-corrosive screw threaded sleeve formed upon and secured in said terminal, and a non-corrosive thumb nut, adapted to screw on said sleeve for removably clamping and sealing said cap on said terminal between said flange and said nut.

In witness whereof I have hereunto affixed my signature.

MALCOM O. SMITH.